United States Patent [19]

Takahashi et al.

[11] Patent Number: 4,859,741
[45] Date of Patent: Aug. 22, 1989

[54] POLYESTER COMPOSITION

[75] Inventors: Katsuhiko Takahashi, Shizuoka; Tsuneyasu Nakashima, Kanagawa; Hiroshi Nakatsuji; Hiroshi Okuda, both of Shizuoka, all of Japan

[73] Assignee: Polyplastics Co., Ltd., Osaka, Japan

[21] Appl. No.: 26,486

[22] Filed: Mar. 16, 1987

Related U.S. Application Data

[63] Continuation-in-part of Ser. No. 850,206, Apr. 10, 1986, abandoned, and a continuation-in-part of Ser. No. 718,903, Apr. 2, 1985, abandoned.

[30] Foreign Application Priority Data

Apr. 4, 1984 [JP] Japan ................. 59-67027
Apr. 10, 1985 [JP] Japan ................. 60-75945

[51] Int. Cl.$^4$ ............................................. C08L 67/02
[52] U.S. Cl. .................................. 525/123; 525/64; 525/66; 525/176; 525/166
[58] Field of Search .............. 528/64, 66, 123, 131, 528/176, 166

[56] References Cited

U.S. PATENT DOCUMENTS

| | | | |
|---|---|---|---|
| 3,193,522 | 7/1965 | Neumann | 525/907 |
| 3,564,077 | 2/1971 | Brinkmann et al. | |
| 3,835,098 | 9/1974 | Brown | 528/301 |
| 3,919,353 | 11/1975 | Castelnuovo | 525/64 |
| 4,010,222 | 3/1977 | Shih | 525/176 |
| 4,022,752 | 5/1977 | Horn et al. | |
| 4,071,503 | 1/1978 | Thomas | 525/440 |
| 4,081,422 | 3/1978 | Cordes | 524/440 |
| 4,110,302 | 8/1978 | Thomas | 524/13 |
| 4,292,233 | 9/1981 | Binsack | 525/64 |

FOREIGN PATENT DOCUMENTS

| | | |
|---|---|---|
| 0072917 | 3/1983 | European Pat. Off. |
| 0157635 | 10/1985 | European Pat. Off. |
| 1576704 | 8/1969 | France. |
| 1208585 | 10/1970 | United Kingdom. |

*Primary Examiner*—Patricia Short
*Attorney, Agent, or Firm*—Robert M. Shaw; Andrew F. Sayko; Platon N. Mandros

[57] ABSTRACT

A polyester composition is disclosed which includes a polyester, (a) a thermoplastic elastomer and (b) a carbodiimide compound having at least one carbodiimide group and which exhibits improved impact resistance at low temperatures and stability to heat, hot water and steam. The composition is useful to form parts which are exposed to low temperatures. A polyalkylene terephthalate resin composition is also disclosed which includes a polyalkylene terephthalate resin, (a) at least one selected from the group consisting of ethylene/alkyl acrylate and a thermoplastic polyester elastomer and (b) at least one selected from the group consisting of an epoxy resin containing at least two carbodiimide groups in the molecule.

3 Claims, No Drawings

POLYESTER COMPOSITION

This application is a continuation-in-part of U.S. patent applications Ser. No. 850,206, filed Apr. 1986, now abandoned, and Ser. No. 718,903, filed Apr. 2, 1985, now abandoned.

BACKGROUND OF THE INVENTION

1. Field of the Invention

The present invention relates to thermoplastic polyester resin compositions having good low-temperature impact characteristics, improved thermal stability, and improved resistance to hot water and water vapor. More particularly the present invention relates to polyalkylene terephthalate resin compositions.

The resin compositions of the present invention are suitable for use in molding onto exterior parts, engine-room parts, electrical equipment parts, and electronic parts. Also, the compositions are useful in molding parts used in construction and other fields of activity and particularly, those parts which are likely to be exposed to a low temperature atmosphere.

2. Description of the Prior Art

Thermoplastic polyester resins, such as polyalkylene terephthalate resins, are widely used as engineering plastics in various industrial fields since they are recognized as having excellent mechanical and physical properties. A large number of such resin compositions have hitherto been proposed which are claimed to have improved properties to meet various characteristic requirements placed on such resins in the individual industrial fields.

While thermoplastic polyester resin compositions have some degree of impact characteristics and thermal stability there may still arise a problem with respect to impact strength if a part molded from such a composition has high notch sensitivity and a noticeably sharp rib or ribs.

In such case, a conventional approach is to add a thermoplastic elastomer to reduce the notch sensitivity. Among suitable elastomers which have conventionally been used are thermoplastic rubbers, such as graft copolymers wherein various vinyl compounds are grafted by using butadiene rubber as a rubber component and polyacrylate resins wherein a modifier composed of such a resin is a polystage polymer having a rubber-like first stage and a thermoplastic rigid final stage, polyolefins modified by block- or graft-copolymerization and/or ethylene-propylene rubber.

Although the addition of such a thermoplastic elastomer may considerably improve the impact resistance in a room temperature atmosphere, it will also result in considerable decrease in the impact strength in low-temperature atmospheres such as $-40°$ C. In these situations, large quantities of an elastomer having good low-temperature characteristics have been added. However, such an addition has been found to cause considerable deterioration in rigidity and other mechanical characteristics, with the result being that the composition no longer may be characterized as an engineering plastic.

Another difficulty with the prior-art compositions improved in such way concerns thermal stability. That is, during their short-time detention in the molten state in a molding machine, the compositions will suffer from deterioration in their physical properties because thermal decomposition will occur with the thermoplastic polyester resin itself and also with the thermoplastic elastomer. Furthermore, when a thermoplastic elastomer is added, recohesion takes place under the molten condition, thereby resulting in a considerable decrease in impact resistance.

As a counter-measure in such a case, normal practice has been to polymeric-plasticize the thermoplastic polyester resin to be used and/or to use a stabilizer. This practice has shown some measure of effect for retaining static strength characteristics such as tensile strength, but have almost no effect for retaining dynamic strength characteristics, such as impact resistance.

Therefore, the first aspect of the present invention relates to a solution to aforesaid problems from the standpoint of modifying the interface between the thermoplastic resin component and the thermoplastic elastomer component in a thermoplastic polyester composition, and also of inhibiting possible molecular weight loss due to thermal decomposition in the thermoplastic polyester resin.

Furthermore, although polyalkylene terephthalate resins are resistant to hot water to some degree, the application of these resins in car parts, which must be used in an atmosphere of hot water, has exhibited a problem in that the resins are hydrolyzed after a considerably short time thereby suffering deterioration in physical properties. In particular, tensile strength and elongation are adversely affected. Although the addition of phosphorus compounds, diene compounds, oxetane compounds or mixtures thereof to the polyalkylene terephthalate resins have been proposed in order to solve such a problem, no satisfactory solution has yet been reached.

Therefore, the second aspect of the present invention relates to solving the above problem by imparting hydrophobicity to the resin and simultaneously forming some network structures in the resin.

SUMMARY OF THE INVENTION

Accordingly, the first aspect of the present invention relates to a thermoplastic polyester resin composition comprising a thermoplastic polyester resin, such as polyalkylene terephthalate which also includes; (A) at least one thermoplastic elastomer and (B) at least one carbodiimide compound having at least one carbodiimide group in a molecule. The low-temperature impact characteristics and molten-state thermal stability of such a thermoplastic polyester resin composition being found to have been greatly improved.

The second aspect of the invention relates to a polyalkylene terephthalate resin composition having superior resistance to hot water which includes a polyalkylene terephthalate resin, to which is added (A) at least one member selected from the group consisting of ethylene/alkyl acrylate and thermoplastic polyester elastomer and (B) at least one member selected from the group consisting of an epoxy resin and a polycarbodiimide.

DETAILED DESCRIPTION OF THE INVENTION

With respect to the above described first aspect of the invention, thermoplastic polyester resins useful for the purpose of the invention are aromatic polyesters, each composed principally of aromatic dicarboxylic acid and diol, or composed of oxycarboxylic acid. Examples of a suitable aromatic dicarboxylic acids include bifunctional carboxylic acid, such as at least one of terephthalic acid, isophthalic acid, 2-methyl terephthalic acid, 4-methyl terephthalic acid, naphthalene dicarboxylic acid, and diphenyl dicarboxylic acid. Terephthalic acid is preferred.

Examples of suitable diols include aliphatic glycols such as at least one of ethylene glycol, propylene glycol, trimethylene glycol, tetramethylene glycol, and neopentyl glycol. Ethylene glycol and tetramethylene glycol are preferred. Also, aromatic dihydroxy compounds, such as 2,2-bis(4-hydroxyphenyl) propane, may be used.

Examples of suitable oxycarboxylic acids include oxybenzoic acid and oxynaphthoic acid.

Particularly preferred thermoplastic polyester resins are polyalkylene terephthalate resins such as polyethylene terephthalate, polytetramethylene terephthalate, and copolymers or mixtures of these. As is well known, these polyester resins are obtainable through polycondensation of terephthalic acid or a lower alkyl ester thereof and alkylene diol. For example, polyethylene terephthalate or polybutylene terephthalate may be produced by polycondensation dimethyl terephthalate and ethylene glycol or 1,4-butane diol after the ester interchange reaction.

In addition, a thermoplastic full aromatic polyester resin composed of one or more kinds of aromatic hydroxy carboxylic acid, and its copolymers or mixtures with any of aforesaid thermoplastic polyester resins.

For the thermoplastic elastomer as component (A) in this invention, all such elastomers generally used, may be used without any particular limitation. These elastomers are broadly classified into two categories, thermoplastic rubbers and thermoplastic elastomers.

Suitable thermoplastic rubbers include copolymers of the type wherein the rubber component is a copolymer of diene-based compounds such as butadiene and isoprene and with which various vinyl compounds are copolymerized. Suitable vinyl compounds are copolymerized. Suitable vinyl compounds include styrene, acrylonitrile, ester acrylate, and ester methacrylate. For example, the so-called MBS resin, wherein butadiene rubber is copolymerized with styrene and ester methacrylate may be advantageously used. It has been found that generally, the higher the proportion of the butadiene component in the copolymer, the better the low-temperature properties.

It is also possible to use any polyacrylate resin wherein a modifier composed of such resin is a polystage polymer having a rubber-like first stage and a thermoplastic rigid final stage, or any polyolefin-based thermoplastic rubber. Typical of the latter and ethylene- and propylene-based copolymers, or modified products thereof.

Among suitable thermoplastic elastomers are modified polyolefin copolymer elastomers, thermoplastic polyester elastomers, polyamide-based elastomers, and thermoplastic urethanes. Examples of the polyolefin-based elastomers include ethylene-vinyl acetate copolymer, ethylene-ethyl acrylate copolymer, and -olefin-maleic anhydride copolymer. Examples of preferred thermoplastic polyester elastomers include caprolactones and segment-type copolyesters having repeated long-chain and short-chain ester units. Typical polyamide-based elastomers are those elastomers which may be produced through modification of nylon 12. Typical thermoplastic urethanes include polyester polyol-type polyurethanes.

One or more kinds of the elastomers may be added to the thermoplastic polyester resin. A suitable range of addition is 1–50% by weight. If the amount of addition falls below this range, hardly any improvement in impact resistance can be obtained. If the amount of addition falls above this range, undesirable effects on other properties such as strength and rigidity may result. A preferred range of addition is 5–30 wt %.

Available for use as component (B), the carbodiimide compound, according to the invention, are those compounds having one or more carbodiimide groups in a molecule. High molecular-weight type compounds linked by carbodiimide groups are preferred.

Among monomer-type compounds which are suitable for use are alkyl-substituted carbodiimides, such as dicyclohexyl carbodiimides, and allyl-substituted carbodiimides such as diphenyl carbodiimides. For high molecular weight types, any polycarbodiimide derived from monomers having two or more isocyanate groups may be used.

Examples of suitable compounds include poly (hexamethylene dicarbodiimide), poly (cyclohexylene dicarbodiimide), poly(tolylcarbodiimide), poly (3,3'-dimethyl-4,4'-biphenylmethane carbodiimide), poly (p-phenylene carbodiimide), poly (m-phenylene carbodiimide), poly (3,3'-dimethyl-4,4'-diphenylmethane carbodiimide), and mixtures thereof. Preferred polycarbodiimides are poly (tolylcarbodiimide), poly (4,4'-diphenylmethane carbodiimide), and mixtures thereof.

One or more kinds of the carbodiimide compounds may be added to the thermoplastic polyester resin.

There is no particular limitation on the degree of polymerization, and all types of such compounds, from oligomer-type to high polymer-type, may be equally used.

A preferred addition range for the carbodiimide compounds is 0.1–10 wt %. If the amount of addition falls below this range, no sufficient effect can be expected for the modification of the interface between the elastomer and the polyester resin such as polyalkylene terephthalate, or for inhibition of deterioration due to the heat of the polyalkylene terephthalate or the like. If the amount of addition is excessive, a tridimensional change of the resin is accelerated and the fluidity thereof is reduced. More preferably, the addition is from 0.5–4 wt %.

Components (A) and (B) used for the composition of the invention preferably have a microfine particle size of 5 or finer from the view point of dispersibility into the polymer.

If the component (A) for the composition of the invention is added alone, it may serve for improving impact resistance at room temperature, and heat resistance, and also for tensile strength retention. However, there may be only a slight improvement in impact resistance at a low temperature such as −40° C. If the component (B) is added alone, it may serve for tensile strength retention under such conditions as short-time detention in the molding machine. However, no perceivable effect can be obtained with respect to impact resistance.

By using the components (A) and (B) in combination in accordance with the present invention, a surprisingly remarkable effect can be obtained. That is, a notched Izod impact strength at −40° C. may be obtained which is almost equal to that at room temperature. Furthermore, no decrease whatever in impact resistance is obtained even if the composition is retained in molten state in the molding machine for a long time (e.g., 30 min). Such a synergistic effect cannot be anticipated by the prior art.

A particular preferred example of the composition is one wherein the component (A) is a copolymer containing a polymer of diene-based compounds as its rubber component and various vinyl compounds copolymerized therewith, and wherein the component (B) is polycarbodiimide.

In order to impart to the composition of the invention further desired characteristics according to the purpose for which it is used, it is possible to incorporate therein one or more kinds of known additives, such as lubricants, nucleating agents, parting agents, antistatic agents, other surface active agents, plasticizers, flame retardants, flame retarding assistants, pigments, dyes, heat stabilizers, and ultraviolet stabilizers.

In order to give still further desired characteristics to the composition of the invention, it is also possible to mix or copolymerize therewith one or more kinds of organic polymer materials. Examples of such polymer materials include polycarbonates, low molecular weight polyethylenes, polypropylenes, polyurethanes, and fluoroplastics.

Furthermore, it is possible to add, to the extent that it is not detrimental to the effect of the invention, one or more kinds of other known reinforcing fillers including inorganic fibers, such as glass fibers, carbon fibers, graphite fibers, metallic fibers, silicon carbide fibers, asbestos, wollastonite, and fibrous potassium titanate. Fibrous reinforcing fillers such as whisker and various organic fibers, lamellar reinforcing fillers such as lamellar glass (glass flake), talc, and metallic foil, and particulate additives such as calcium carbonate, quartz powder, silica, magnesium carbonate, calcium sulfate, clay, diatomaceous earth, alumina, silica sand, glass powder, graphite, and glass bead, may be used.

The composition of the invention may be easily prepared according to any known method generally employed in preparing the conventional type of resin composition. For example, one method is such that the individual components are mixed, the mixture is then kneaded and extruded into pellets by employing an extruder, and subsequently, the pellets are molded into shape. Another method involves preparing pellets of different compositions, mixing the pellets in specified proportions, molding the mixture into shape so that a part of the desired composition is obtained after molding. A further method involves directly charging one or more of the components int the molding machine.

Therefore, according to the first aspect of the invention, a thermoplastic polyester compound is provided which has high impact resistance in a low-temperature atmosphere and good stability in molten state, a factor which is critical particularly in the case of large-sized part molding.

The thermoplastic polyester resin composition, more particularly polyalkylene terephthalate resin composition, according to this aspect of the invention exhibits good performance in those fields in which high impact resistance is required under severe conditions such as in auto exterior parts, electrical equipment parts, and electronic parts, and also in construction fields. More particularly, such a composition exhibits good performance in those areas in which thermal stability at the time of large part molding is required, such as areas having not been considered as being markets for polyalkylene terephthalate resins.

In these areas, metals have generally been used, and considerable restrictive conditions have necessarily been imposed for the use of plastics. However, by using the composition of the present invention, such problems can be overcome. Therefore, the economical advantage of the present invention is exceedingly great.

With respect to the above described second aspect of the invention, the polyalkylene terephthalate resin used in the present invention is a polyester which may be obtained by the polycondensation between terephthalic acid or its lower alkyl ester and a alkylenediol. For example, a polybutylene terephthalate resin, which is produced by an ester-exchange reaction and subsequent polycondensation between dimethyl terephthalate and 1,4-butanediol, are most suitable for the base resin in the present invention. Also, copolymers containing polybutylene terephthalate as the main ingredient or mixtures thereof with polyethylene terephthalate, and the like, may be used. In addition, it is desirable in the present invention that the polyalkylene terephthalate resin contain glass fibers in an amount of 0 to 60% by weight therein.

According to the present invention, at least one member selected from the group consisting of ethylene/alkyl acrylate and a thermoplastic polyester elastomer, as the ingredient (A), is added to the polyalkylene terephthalate resin in an amount of 1 to 50% by weight based on the total resin composition. If it is added in an amount less than about 1%, no sufficient effect can be obtained. If it is added in an amount larger than about 50%, the strength of the resin will deteriorate. Thus, it is most preferably added in an amount of 3 to 25% by weight.

The ingredient (A) serves to impart elasticity to the resin and is particularly effective in improving impact resistance and elongation. However, the addition of it alone to the polyalkylene terephthalate resin can bring about no appreciable improvement in resistance to hot water. The effect of improving the resistance to hot water, or, to hydrolysis can be remarkably increased by using these substances together with additives comprising ingredient (B).

The ethylene-alkyl acrylate herein refers to a copolymer of ethylene and an alkyl acrylate in an arbitrary ratio, among which an ethylene/ethyl acrylate copolymer is the most useful. The thermoplastic polyester elastomers are preferably segmented copolyesters consisting of repeating long-chain units and short-chain units.

The ingredient (B), that is, at least one member selected from the group consisting of an epoxy resin and a polycarbodiimide, is added to the polyalkylene terephthalate resin in addition to the ingredient (A), the ethylene/alkyl acrylate or a thermoplastic polyester elastomer in the production of the composition according to the present invention. Ingredient (B) is added in an amount of 0.1 to 10% by weight based on the total resin composition. The addition thereof in an amount less than about 0.1% is ineffective in improving resistance to hot water by establishing a three-dimensional, or a network structure in the resin. The addition of too much lowers the fluidity of the resin. Therefore, it is preferably added in an amount of 0.5 to 5% by weight.

Although it is effective in improving the resistance to hydrolysis even when added by itself, a remarkable improvement in resistance to hot water was observed by adding it together with the ingredient (A).

The epoxy resins used in the present invention are diepoxide compounds containing at least two epoxy groups in the molecule and produced by known methods. These include polycondensates between an epihalohydrin such as epichlorhydrin and a diol preferably containing up to 15 carbon atoms such as diphenylolpropane (hereinafter referred to as diphenol "A") in an arbitrary ratio, bis(2, 3-epoxypropanol) esters obtained by an esterification reaction between a dicarboxylic acid preferably containing up to 15 carbon atoms, such as terephthalic, phthalic, 2-6-naphthalene dicarboxylic, adipic, succinic or dodecane dicarboxylic acid, and 2,3-epoxypropanol and cycloaliphatic diepoxides preferably containing 5 to 15 carbon atoms, such as cyclooctadiene-(1,5) diepoxide, 1,2,5,6-diepoxycyclododecane-(9), bicycloheptadiene diepoxide or dicyclopentadiene diepoxide.

The polycarbodiimides are compounds which contain at least two carbodiimide groups in the molecule and which are usually derived from isocyanate compounds. Preferred carbodiimide compounds include those derived from aromatic diisocyanates such as phenylene diisocyanate, toluene diisocyanate, methylenebisphenyl diisocyanate and xylene diisocyanate, as well as aliphatic diisocyanates such as hexamethylene diisocyanate and isophorone diisocyanate.

Furthermore, known additives such as various kinds of stabilizers, lubricants, nucleating agents, plasticizers, releasing agents, antistatic agents, flame resisting agents, organic high-molecular materials for improving physical properties, fibrous, acicular, plate-like or powdery inorganic substances or metals, and/or coloring agents such as carbon black and other dyes and pigments may be added to the composition according to the present invention.

The composition according to the present invention may be obtained in the form of pellets by extruding the compound which is prepared by blending a mixture including a polyalkylene terephthalate resin and given amounts of necessary additives added to said polyalkylene terephthalate resin at once in a blender, an extruder, or by extruding in at least two steps (e.g., extruding the compounds containing a portion of the necessary additives and then adding the remaining portion of the necessary additives followed by extruding the resulting compounds again). In addition, some kinds of ingredients may be added during the molding process in order to obtain molded product containing them.

The obtained pellets of the composition are preliminarily dried and then molded to obtain molded products comprising a polybutylene terephthalate composition having superior resistance to hot water.

Both aspects of the present invention will now be described in more detail with reference to the examples. It should, however, be understood that the present invention is by no means limited to these examples. All of the amounts of ingredients described in examples and comparative examples are represented in % by weight unless otherwise indicated. In the Examples and Comparative Examples below, Examples 1A to 7A and Comparative Examples 1A to 4A relate to the first aspect of the invention. Examples 1B to 12B and Comparative Examples 1B to 6B relate to the second aspect of the invention.

EXAMPLES 1A TO 7A, COMPARATIVE EXAMPLES 1A TO 4A

To a polybutylene terephthalate having an inherent viscosity of 1.0 there was added a butadiene-styrene-methyl methacrylate copolymer or a thermoplastic segment-type copolyester (duPont, "Hytrel 4056") as component (A) thermoplastic elastomer, and poly (4,4'-diphenylmethane carbodiimide) as component (B) polycarbodiimide, in such proportions as shown in Table 1A. A pellet-form composition was prepared from the mixture by employing a double screw extruder. Then, from the pellet an ASTM impact test piece (⅛ inch thick) was molded by an injection molding machine set at a cylinder temperature of 250° C.

Test pieces molded according to conventional molding cycle (injection time 20 sec+cooling time 10 sec) were identified as test pieces with detention of 0 min in the molding machine. Test pieces were again molded after being retained in the molding machine for 30 min. Comparison was made with respect to heat stability.

Low-temperature impact strength tests were made at ordinary temperature (23° C.×65% RH) and in accordance with ASTM D-638 Method after the test pieces are allowed to stand for 20 min in an atmosphere of −40° C.

Evaluation for modulus in flexure was made in accordance with ASTM D-790 Method after the test pieces were allowed to stand at 23° C. and 65% RH for 24 hours.

The evaluation results are shown in Table 1A.

For the purpose of comparison, test pieces in which either (A) or (B) was omitted and those in which both components were omitted were evaluated in the same manner as in the Examples. The evaluation results are also shown in Table 1A under the comparative example column.

TABLE 1A

| Composition/Property | Unit/Test method | Examples | | | | | | | Comparative Examples | | | |
|---|---|---|---|---|---|---|---|---|---|---|---|---|
| | | 1A | 2A | 3A | 4A | 5A | 6A | 7A | 1A | 2A | 3A | 4A |
| Composition | | | | | | | | | | | | |
| *Polybutylene terephthalate | wt % | 78 | 85 | 88 | 73 | 83 | 79 | 78 | 100 | 80 | 98 | 75 |
| *Thermoplastic elastomer | | | | | | | | | | | | |
| I (*1) | " | 20 | 10 | 10 | | 15 | 20 | | | 20 | | 20 |
| II (*2) | " | | | | 5 | | | 20 | | | | 5 |
| *Polycarbodiimide | " | 2 | 5 | 2 | 2 | 2 | 1 | 2 | | | 2 | |
| Property | | | | | | | | | | | | |
| *Izod impact strength Detention time in molder | ASTM D-638 Test condition | | | | | | | | | | | |
| 0 min | Kg cm/cm 23° C. | 92.6 | 70.0 | 60.3 | 93.4 | 75.0 | 91.3 | 83.3 | 4.8 | 61.2 | 5.0 | 87.9 |
| | −40° C. | 29.7 | 22.1 | 18.0 | 49.6 | 25.2 | 29.0 | 27.1 | 1.5 | 7.1 | 4.6 | 28.0 |
| 30 min | 23° C. | 83.6 | 70.0 | 20.0 | 93.0 | 40.2 | 60.4 | 51 | 3.6 | 6.6 | 4.0 | 27.9 |
| *Modulus in | ASTM D-790 | 16,000 | 21,000 | 21,000 | 13,600 | 18,500 | 16,500 | 15,500 | 26,000 | 16,000 | 26,000 | 13,900 |

TABLE 1A-continued

| Composition/Property | Unit/Test method | Examples | | | | | | | Comparative Examples | | | |
|---|---|---|---|---|---|---|---|---|---|---|---|---|
| | | 1A | 2A | 3A | 4A | 5A | 6A | 7A | 1A | 2A | 3A | 4A |
| flexure | kg/cm² | | | | | | | | | | | |

(*1) Butadiene-styrene-methyl methacrylate copolymer
(*2) Thermoplastic segment-type copolyester

EXAMPLES 1B TO 12B

Given amounts of substances A and B as shown in Table 1B were added to a polybutylene terephthalate resin (PBT) containing glass fibers in an amount of 30%. The resulting mixture is blended in a blender and then extruded in an extruder to prepare pellets. The resulting pellets are dried in an atmosphere of hot air all night and then molded in a molding machine to prepare test pieces. The test pieces, which were dipped in hot water of 95° C. for given periods, were tested on tensile strength in order to study changes in the tensile strength with time. These tests were carried out in accordance with ASTM D638-58T on a Toyo-Baldwin tension tester UTM-1-250. The results are shown in Table 1B.

COMPARATIVE EXAMPLES 1B TO 6B

The test pieces are prepared in the same manner as in Examples 1B to 12B except that both or either of said substances A and B were not added. The test were carried out under the same conditions as in Examples. The results are shown in Table 1B.

As to numerical values described in Table 1B, those in the upper column indicate the tensile strength (kg/cm²), with those in the lower columns indicating the elongation (%), and those in parentheses indicating the retaining rate when the initial value is 1.00.

As understood from the results obtained in Examples 1B to 12B and Comparative Examples 1B to 6B, the composition according to the second aspect of the present invention can remarkably prolong the service life of resins for the uses requiring resistance to hot water and hold superior values of tensile strength and elongation even in an atmosphere of warm or hot water. Therefore, the second aspect of the present invention can provide a polybutylene terephthalate resin composition remarkably suitable for use in the presence of water, in particular, at higher temperature for uses such as car parts.

TABLE 1B

| | | Example 1B | Example 2B | Example 3B | Example 4B | Example 5B | Example 6B | Example 7B | Example 8B | Example 9B | Example 10B | Example 11B | Example 12B |
|---|---|---|---|---|---|---|---|---|---|---|---|---|---|
| Composition (% by weight) | | | | | | | | | | | | | |
| PBT containing 30% glass fibers | | 95.2 | 89.2 | 79.2 | 95.2 | 88 | 94 | 95.2 | 89.2 | 79.2 | 95.2 | 88 | 94 |
| Substance A | | *1 | *1 | *1 | *2 | *1 | *2 | *1 | *1 | *1 | *2 | *1 | *2 |
| | | 4 | 10 | 20 | 4 | 10 | 4 | 4 | 10 | 20 | 4 | 10 | 4 |
| Substance B | | *3 | *3 | *3 | *3 | *3 | *3 | *4 | *4 | *4 | *4 | *4 | *4 |
| | | 0.8 | 0.8 | 0.8 | 0.8 | 2 | 2 | 0.8 | 0.8 | 0.8 | 0.8 | 2 | 2 |
| Others | | — | — | — | — | — | — | — | — | — | — | — | — |
| Number of days during which the test pieces are dipped | | | | | | | | | | | | | |
| 0 day | Tensile strength | 1229 | 1175 | 1081 | 1233 | 1182 | 1263 | 1251 | 1180 | 993 | 1241 | 1192 | 1302 |
| | | (1.00) | (1.00) | (1.00) | (1.00) | (1.00) | (1.00) | (1.00) | (1.00) | (1.00) | (1.00) | (1.00) | (1.00) |
| | Elongation | 3.0 | 3.3 | 3.5 | 3.1 | 3.4 | 3.1 | 3.0 | 3.3 | 4.1 | 3.1 | 3.2 | 2.9 |
| | | (1.00) | (1.00) | (1.00) | (1.00) | (1.00) | (1.00) | (1.00) | (1.00) | (1.00) | (1.00) | (1.00) | (1.00) |
| 5 days | Tensile strength | 1131 | 1093 | 973 | 1147 | 1123 | 1187 | 1151 | 1086 | 884 | 1142 | 1120 | 1210 |
| | | (0.92) | (0.93) | (0.90) | (0.93) | (0.95) | (0.94) | (0.92) | (0.92) | (0.89) | (0.92) | (0.94) | (0.93) |
| | Elongation | 2.6 | 2.9 | 3.1 | 2.6 | 3.0 | 2.6 | 2.7 | 2.9 | 3.6 | 2.6 | 2.9 | 2.4 |
| | | (0.80) | (0.87) | (0.89) | (0.84) | (0.89) | (0.85) | (0.89) | (0.88) | (0.88) | (0.85) | (0.90) | (0.83) |
| 10 days | Tensile strength | 1106 | 1034 | 886 | 1048 | 1076 | 1086 | 1101 | 1027 | 794 | 1067 | 1073 | 1146 |
| | | (0.90) | (0.88) | (0.82) | (0.85) | (0.91) | (0.86) | (0.81) | (0.87) | (0.80) | (0.86) | (0.90) | (0.88) |
| | Elongation | 2.5 | 2.7 | 3.0 | 2.3 | 2.9 | 2.4 | 2.5 | 2.7 | 3.6 | 2.5 | 2.8 | 2.2 |
| | | (0.83) | (0.83) | (0.85) | (0.73) | (0.84) | (0.78) | (0.84) | (0.82) | (0.87) | (0.80) | (0.86) | (0.77) |
| 15 days | Tensile strength | 1069 | 1011 | 865 | 1011 | 1040 | 1048 | 1038 | 991 | 725 | 1042 | 930 | 1107 |
| | | (0.87) | (0.86) | (0.80) | (0.82) | (0.88) | (0.83) | (0.83) | (0.84) | (0.73) | (0.84) | (0.78) | (0.85) |
| | Elongation | 2.1 | 2.4 | 2.6 | 2.1 | 2.5 | 2.1 | 2.0 | 2.3 | 3.2 | 2.1 | 2.3 | 1.9 |
| | | (0.70) | (0.72) | (0.75) | (0.67) | (0.73) | (0.69) | (0.69) | (0.70) | (0.77) | (0.68) | (0.73) | (0.64) |
| 20 days | Tensile strength | 922 | 881 | 767 | 900 | 898 | 960 | 888 | 885 | 636 | 931 | 810 | 1042 |
| | | (0.75) | (0.75) | (0.71) | (0.73) | (0.76) | (0.76) | (0.71) | (0.75) | (0.64) | (0.75) | (0.68) | (0.80) |
| | Elongation | 1.8 | 2.1 | 2.3 | 1.8 | 2.0 | 1.7 | 1.8 | 2.0 | 2.8 | 1.8 | 2.0 | 1.5 |
| | | (0.60) | (0.65) | (0.66) | (0.59) | (0.59) | (0.55) | (0.60) | (0.61) | (0.68) | (0.57) | (0.61) | (0.52) |
| 30 days | Tensile strength | 676 | 682 | 551 | 641 | 745 | 758 | 625 | 637 | 417 | 558 | 668 | 664 |
| | | (0.50) | (0.50) | (0.51) | (0.52) | (0.63) | (0.60) | (0.50) | (0.54) | (0.42) | (0.45) | (0.56) | (0.51) |
| | Elongation | 1.3 | 1.6 | 1.8 | 1.4 | 1.5 | 1.3 | 1.35 | 1.6 | 2.2 | 1.3 | 1.5 | 1.1 |
| | | (0.43) | (0.47) | (0.50) | (0.45) | (0.44) | (0.41) | (0.45) | (0.47) | (0.54) | (0.43) | (0.48) | (0.37) |

| | Comparative Example 1B | Comparative Example 2B | Comparative Example 3B | Comparative Example 4B | Comparative Example 5B | Comparative Example 6B |
|---|---|---|---|---|---|---|
| Composition (% by weight) | | | | | | |
| PBT containing 30% glass fibers | 100 | 90 | 89.5 | 96 | 98 | 98 |
| Substance A | — | *1 | *1 | *2 | — | — |
| | | 10 | 10 | 4 | | |
| Substance B | — | — | — | — | *3 | *4 |
| | | | | | 2 | 2 |
| Others | — | — | *5 | — | | |

TABLE 1B-continued

| Number of days during which the test pieces are dipped | | | | | | | |
|---|---|---|---|---|---|---|---|
| | | | | | 0.5 | | |
| 0 day | Tensile strength | 1376 | 1180 | 1170 | 1290 | 1350 | 1367 |
| | | (1.00) | (1.00) | (1.00) | (1.00) | (1.00) | (1.00) |
| | Elongation | 2.8 | 2.9 | 2.8 | 2.6 | 2.8 | 2.8 |
| | | (1.00) | (1.00) | (1.00) | (1.00) | (1.00) | (1.00) |
| 5 days | Tensile strength | 1228 | 1038 | 550 | 1053 | 1161 | 1217 |
| | | (0.82) | (0.88) | (0.47) | (0.82) | (0.86) | (0.89) |
| | Elongation | 2.2 | 2.3 | 0.9 | 2.0 | 2.2 | 2.3 |
| | | (0.77) | (0.79) | (0.31) | (0.77) | (0.77) | (0.81) |
| 10 days | Tensile strength | 936 | 850 | 363 | 764 | 906 | 1025 |
| | | (0.68) | (0.72) | (0.31) | (0.59) | (0.76) | (0.75) |
| | Elongation | 1.5 | 1.6 | 0.6 | 1.2 | 1.9 | 0.8 |
| | | (0.52) | (0.54) | (0.23) | (0.46) | (0.69) | (0.76) |
| 15 days | Tensile strength | 743 | 578 | 257 | 573 | 904 | 875 |
| | | (0.54) | (0.49) | (0.22) | (0.44) | (0.67) | (0.64) |
| | Elongation | 1.0 | 1.1 | 0.5 | 0.8 | 1.7 | 1.4 |
| | | (0.36) | (0.39) | (0.18) | (0.31) | (0.60) | (0.51) |
| 20 days | Tensile strength | 481 | — | — | — | — | — |
| | | (0.35) | | | | | |
| | Elongation | 0.8 | — | — | — | — | — |
| | | (0.29) | | | | | |
| 30 days | Tensile strength | 358 | — | — | — | — | — |
| | | (0.26) | | | | | |
| | Elongation | 0.5 | — | — | — | — | — |
| | | (0.18) | | | | | |

Notes
*1: Ethylene/ethyl acrylates (EEA-BRT-490, a product of Nihon Unicar Co., Ltd.)
*2: Polyester elastomer (Hytrel-4056, a product of Showa Neoprene Co., Ltd.)
*3: Polycarbodiimide (Stavakzol-PCD, a product of Hiraizumi Yoko Co., Ltd.)
*4: Epoxy resin (Epikote 819, a product of Toray Industries, Inc.)
*5: Tridecyl phosphite

What is claimed is:

1. A polyester composition consisting essentially of polybutylene terephthalate, (a) 1 to 50 percent by weight, based on said polybutylene terephthalate of a thermoplastic elastomer which is a copolymer of butadiene, styrene and methylmethacrylate, and (b) 0.1 to 10 percent by weight based on the weight of said polybutylene terephthalate of a low-temperature temperature impact strength and molten-state thermal stability improving component which is a polycarbodiimide.

2. A composition according to claim 1, wherein said polycarbodiimide is a polymer having carbodiimide groups.

3. A composition according to claim 1, wherein additives (a) and (b) have an average particle size of 5 microns or smaller.

* * * * *